(12) United States Patent
Amman et al.

(10) Patent No.: US 11,659,939 B2
(45) Date of Patent: May 30, 2023

(54) VEHICLE SEATING ASSEMBLY

(71) Applicant: Ford Global Technologies, LLC, Dearborn, MI (US)

(72) Inventors: Scott Andrew Amman, Milford, MI (US); Avrokin Surnilla, West Bloomfield, MI (US); Nikhitha Bekkanti, Farmington Hills, MI (US); John Craig Elson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/666,623

(22) Filed: Feb. 8, 2022

(65) Prior Publication Data

US 2022/0160144 A1   May 26, 2022

Related U.S. Application Data

(62) Division of application No. 16/720,513, filed on Dec. 19, 2019, now Pat. No. 11,272,790.

(51) Int. Cl.
| | |
|---|---|
| *A47C 31/12* | (2006.01) |
| *A47C 31/00* | (2006.01) |
| *B60N 2/00* | (2006.01) |
| *B60N 2/56* | (2006.01) |

(52) U.S. Cl.
CPC .......... *A47C 31/126* (2013.01); *A47C 31/008* (2013.01); *B60N 2/002* (2013.01); *B60N 2/5678* (2013.01)

(58) Field of Classification Search
None
See application file for complete search history.

(56) References Cited

U.S. PATENT DOCUMENTS

| | | | |
|---|---|---|---|
| 5,626,021 A | 5/1997 | Karunasir et al. | |
| 7,762,582 B2 | 7/2010 | Breed | |
| 9,676,310 B2 | 6/2017 | Fitzpatrick et al. | |
| 11,058,809 B2* | 7/2021 | Elahi | G16H 10/60 |
| 11,453,423 B1* | 9/2022 | Pickard | B61L 23/048 |
| 2004/0195227 A1 | 10/2004 | Park | |
| 2005/0225128 A1 | 10/2005 | Diemer et al. | |
| 2006/0003872 A1* | 1/2006 | Chiles | A63B 22/0605 |
| | | | 482/8 |
| 2011/0240751 A1* | 10/2011 | Rauh | B64D 13/00 |
| | | | 236/91 D |
| 2014/0309806 A1* | 10/2014 | Ricci | G05D 23/1917 |
| | | | 701/1 |

(Continued)

FOREIGN PATENT DOCUMENTS

JP    2010036751 A    2/2010

*Primary Examiner* — David E Allred
(74) *Attorney, Agent, or Firm* — Vichit Chea; Price Heneveld LLP

(57) ABSTRACT

A vehicle seating assembly includes a seat base that has a first heating element. A seat back has a second heating element. A sensor is coupled to the seat base and is configured to obtain a weight data. A user-interface assembly is operably coupled to the first and second heating elements. A controller is in communication with the sensor to receive the weight data. The controller is configured to control the first and second heating elements in response to the weight data.

19 Claims, 11 Drawing Sheets

(56) References Cited

U.S. PATENT DOCUMENTS

| | | | |
|---|---|---|---|
| 2014/0310739 A1* | 10/2014 | Ricci | G06Q 20/321 |
| | | | 725/75 |
| 2016/0258806 A1 | 9/2016 | Chiu | |
| 2017/0096080 A1 | 4/2017 | McLean, Jr. et al. | |
| 2018/0118064 A1 | 5/2018 | Sato et al. | |
| 2018/0273211 A1 | 9/2018 | Chang et al. | |
| 2018/0351069 A1 | 12/2018 | Boukai et al. | |
| 2019/0279754 A1* | 9/2019 | Brockmeier | G16H 40/67 |
| 2020/0064182 A1* | 2/2020 | Lin | G01G 23/36 |
| 2021/0015314 A1 | 1/2021 | Sylvia | |
| 2022/0068503 A1* | 3/2022 | Yuz | H04L 9/0637 |
| 2022/0155134 A1* | 5/2022 | Lin | A61B 5/6891 |
| 2022/0351171 A1* | 11/2022 | Grogan | G01G 19/4144 |

* cited by examiner

VEHICLE SEATING ASSEMBLY

CROSS-REFERENCE TO RELATED APPLICATION

The present application is a divisional of U.S. patent application Ser. No. 16/720,513 filed Dec. 19, 2019, entitled VEHICLE SEATING ASSEMBLY, now U.S. Pat. No. 11,272,790, the entire disclosure of which is hereby incorporated herein by reference.

FIELD OF THE DISCLOSURE

The present disclosure generally relates to seating assembly, and more specifically, the present disclosure relates to a vehicle heating assembly.

BACKGROUND OF THE DISCLOSURE

Vehicles often have seats that can be heated. The seats typically have a heating member in a base of the seat and another heating member in a back of the seat. A passenger within the vehicle can generally adjust the heat supplied to the seat.

SUMMARY OF THE DISCLOSURE

According to at least one aspect of the present disclosure, a vehicle seating assembly includes a seat base that has a first heating element. A seat back has a second heating element. A sensor is coupled to the seat base and is configured to obtain a weight data. A user-interface assembly is operably coupled to the first and second heating elements. A controller is in communication with the sensor to receive the weight data. The controller is configured to control the first and second heating elements in response to the weight data.

According to another aspect of the present disclosure, a heating system for a seating assembly includes a seat base that has a first heating element. A seat back is coupled to the seat base and has a second heating element. A portable electronic device is configured to receive a weight data input. A controller is in communication with the portable electronic device to receive the weight data input. The controller is configured to independently control the first and second heating elements in response to the weight data input.

According to another aspect of the present disclosure, a method of heating a seating assembly includes obtaining a weight data of an occupant on a seating assembly. A first target temperature is determined for a first heating element disposed in a seat base based on the weight data. A second target temperature is determined for a second heating element disposed in a seat back based on the weight data. Heat is supplied to the seat base and the seat back based on the first and second target temperatures.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
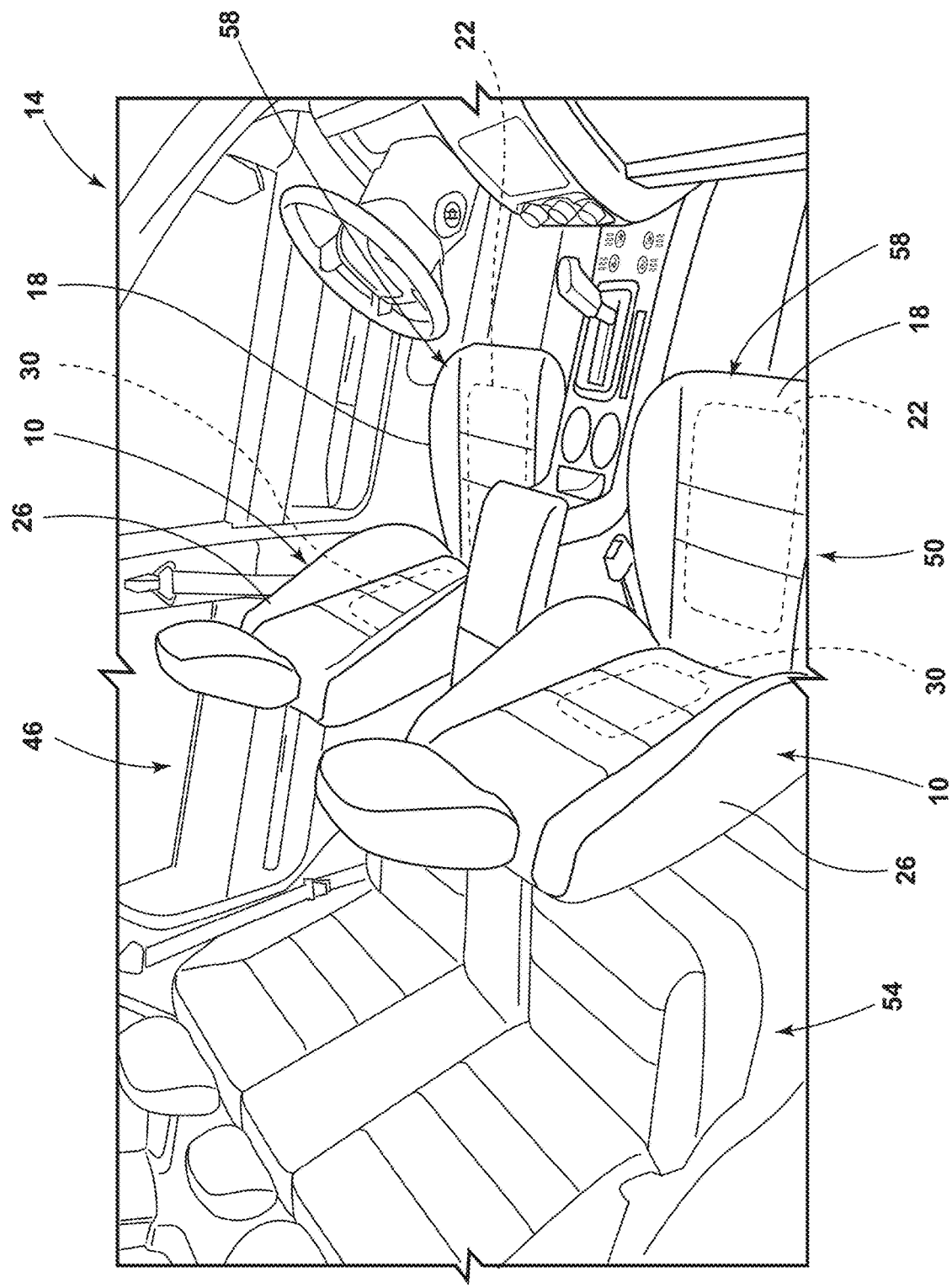
FIG. 1 is a side perspective view of a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11 reference numeral 10 generally refers to a seating assembly for a vehicle 14. A seat base 18 has a first heating element 22 and a seatback 26 has a second heating element 30. A sensor 34 is coupled to at least one of the seat base 18 and the seatback 26. The sensor 34 is configured to obtain weight data. A user-interface assembly 38 is operably coupled to the first and second heating elements 22, 30. A controller 42 is in communication with the sensor 34 to receive the weight data. The controller 42 is configured to control the first and second heating elements 22, 30 in response to the weight data.

Referring to FIG. 1, the vehicle 14 typically includes a passenger cabin 46 that has multiple seating rows 50, 54, each having at least one seating assembly 10. It is contemplated that the configuration of the seating rows 50, 54 as illustrated in FIG. 1 is merely exemplary, such that any the vehicle 14 can include any practicable seating configuration. Moreover, each seat within the passenger cabin 46 may be configured as the seating assembly 10 described herein. The vehicle 14 may be a sedan, a sport utility vehicle, a van, a truck, a crossover, or another style of vehicle 14. In various examples, the vehicle 14 may be a manually operated vehicle 14 (e.g., with a human driver), a fully autonomous vehicle 14 (e.g., with no human driver), or a partially autonomous vehicle 14 (e.g., operated with or without a human driver). Additionally, the vehicle 14 may be utilized for personal and/or commercial purposes, such as for ride-providing services (e.g., chauffeuring) and/or ride sharing services.

Referring still to FIG. 1, each seating assembly 10 within the vehicle 14 includes a heating system 58 that has the first and second heating elements 22, 30. The first heating element 22 may be coupled to and/or disposed within the seat base 18 and the second heating element 30 may be coupled to and/or disposed within the seatback 26. This configuration can provide for two independent heating elements within the seating assembly 10. When an occupant is seated on the seating assembly 10, the first heating element 22 can operate to warm the thighs or legs of the occupant, while the second heating element 30 can operate to heat the back of the occupant.

Figure 2:
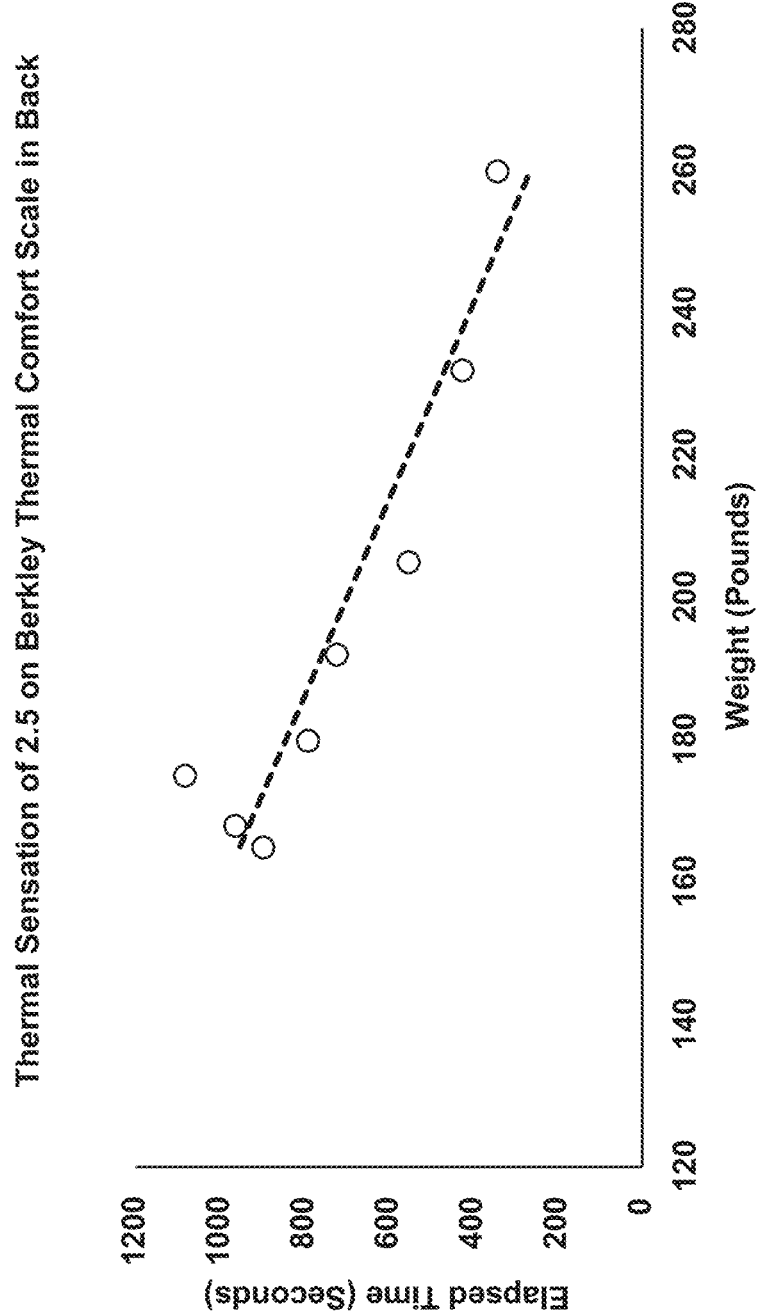
FIG. 2 is a graph illustrating a relationship between weight and time to reach a predefined thermal comfort level, according to one example.

Referring to FIGS. 1 and 2, the weight of the occupant seated on the seating assembly 10 may be a factor that influences the amount of time for the back of the occupant to reach a predefined thermal sensation level, as determined using the Berkeley Thermal Comfort/Sensation Scale. As illustrated in the example of FIG. 2, there can be a negative linear relationship between the weight of the occupant and the elapsed time to reach a thermal sensation of 2.5 on the Berkeley Thermal Comfort/Sensation Scale for the back of the occupant. The data illustrated in FIG. 2, as well as FIGS. 3-6, were obtained using a heated seat system at level three in a 2019 Ford Fusion Energi Titanium seat heating system, the Berkeley Thermal Comfort/Sensation Scale, and weights of male occupants. The thermal sensation of 2.5 on the Berkeley Thermal Comfort/Sensation Scale corresponds to a thermal sensation of slightly hot as perceived by the occupant. Moreover, the data illustrated in FIG. 2, as well as FIGS. 3-6, were collected using the weight of male occupants; however, it is contemplated that a similar relationship between weight and elapsed time exists for female occupants.

Referring again to FIGS. 1 and 2, the exemplary data produced a negative linear relationship between weight and time to reach a thermal sensation level of 2.5. As such, the greater the weight of the occupant seated on the seating assembly 10, the less amount of time was taken for the thermal sensation of 2.5 in the back of the occupant to be reached. In this way, the weight of the occupant can change the perceived heating of the seating assembly 10, which can result in unequal perceived heating of the seating assembly 10 for occupants with different weights.

Figure 3:
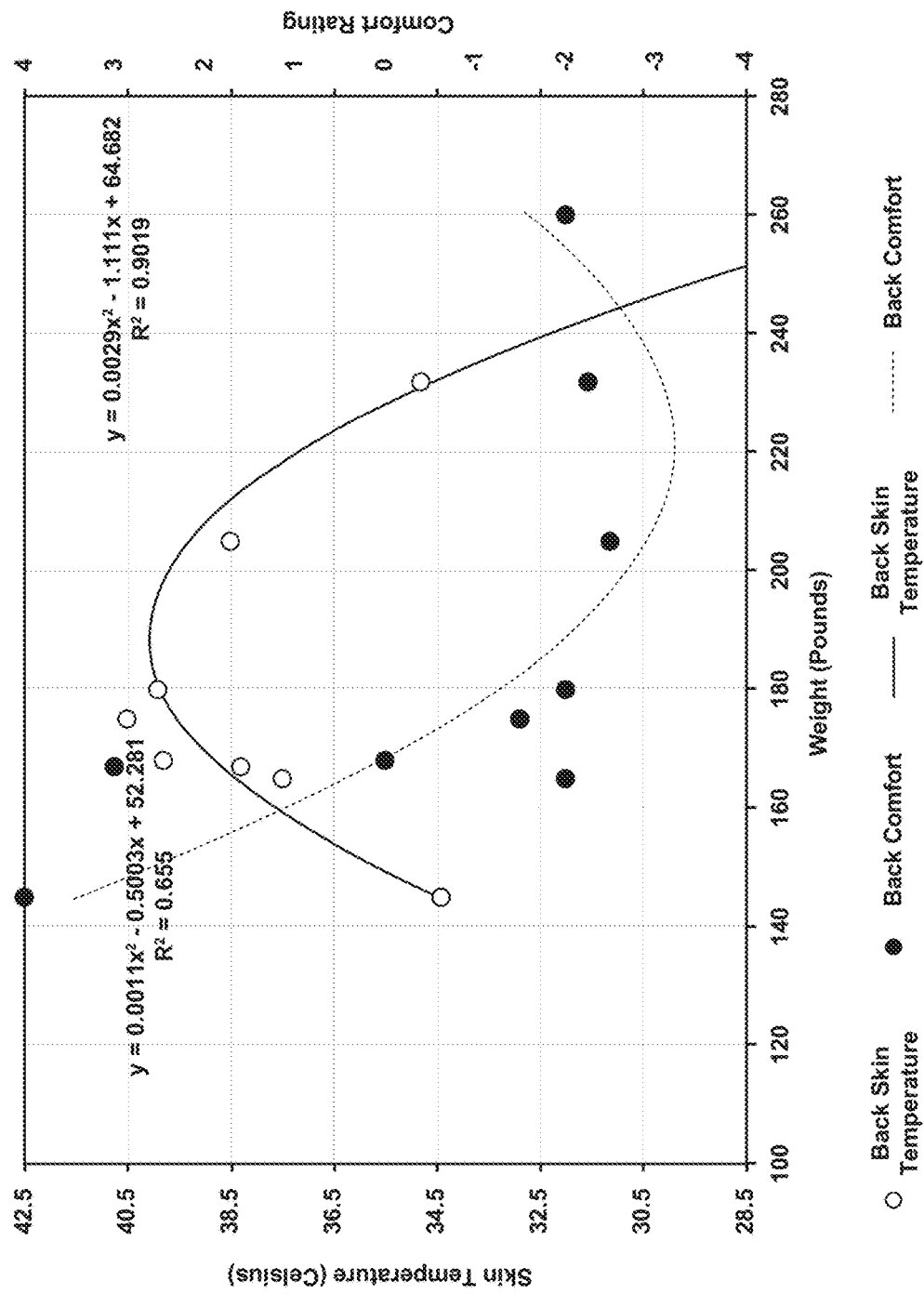
FIG. 3 is a graph illustrating a relationship between weight, skin temperature, and thermal comfort for a back of an occupant, according to one example.

Referring to FIGS. 1 and 3, the exemplary data illustrates a relationship between weight, back skin temperature, and back thermal comfort. As illustrated in FIG. 3, the back skin temperature of the exemplary data produced a parabolic fitted line relative to the weight of the occupant. In this way, the back skin temperature increases with weight to a predefined weight (e.g., an apex) and then decreases as weight continues to increase. As illustrated in FIG. 3, occupants having a weight in a range of from about 170 pounds to about 210 pounds had the highest back skin temperatures.

The exemplary data illustrated in FIG. 3 produced a substantially opposite trend for back thermal comfort of the occupant within the seating assembly 10 using the Berkeley Thermal Comfort/Sensation Scale. As the weight of the occupant increased, the back thermal comfort decreased to a predefined weight, then the back thermal increased as weight continued to increase. In FIG. 3, the exemplary data illustrates that the occupants having a weight in a range of from about 190 pounds to about 240 pounds had the lowest back thermal comfort.

As illustrated in FIG. 3, the back skin temperature correlates with the back thermal comfort, as well as the weight of the occupant. In the non-limiting example of FIG. 3, the data of the back skin temperature produced a parabolic fitted line with the equation $y=0.0011x^2-0.5003x+52.281$, and the data collected regarding back thermal comfort produced a parabolic fitted line having the equation $y=0.0029x^2-1.111x+64.682$. As illustrated in FIG. 3, the back skin temperature of the occupant increased with weight to predefined weight, while the back thermal comfort of the occupant decreased with the weight. Therefore, as the back skin temperature of the occupant increases, the thermal comfort of the occupant can decrease.

Figure 4:
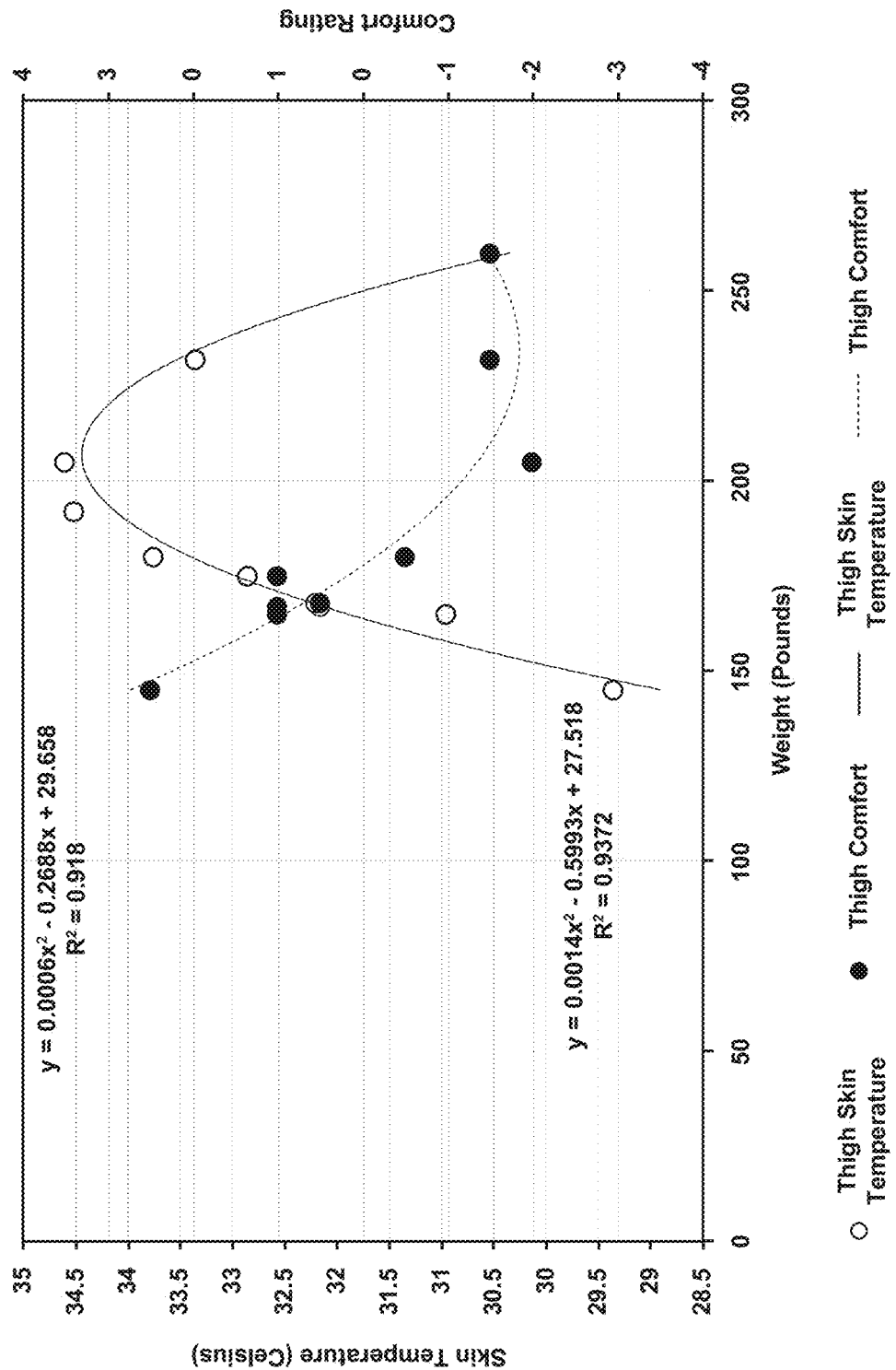
FIG. 4 is a graph illustrating a relationship between weight, skin temperature, and thermal comfort for thighs of an occupant, according to one example.

Referring to FIGS. 1 and 4, the exemplary data illustrates a relationship between thigh skin temperature, weight, and the thigh thermal comfort of the occupant seated on the seating assembly 10. The data illustrates an increase in thigh skin temperature with an increase in weight to a predefined weight, and then the thigh skin temperature decreased as weight continued to increase forming a parabolic fitted line having an equation of $y=0.0014x^2-0.5993x+27.518$. Moreover, the thigh comfort of the occupant, as illustrated in FIG. 4, decreased with an increase in weight to a predefined weight and then increased as weight continued to increase, producing a parabolic fitted line having an equation of $y=0.0014x^2-0.5993x+27.518$. As such, the thigh skin temperature can increase with an increase in weight, which also correlates with a decrease in thigh thermal comfort. As illustrated in FIG. 4, occupants having a weight in a range of from about 190 pounds to about 230 pounds experienced the highest thigh skin temperature and experienced the lowest levels of thigh thermal comfort.

Referring to FIGS. 2-4, the data relating to the back skin temperature produced a similar trend as the data relating to the thigh skin temperature. Further, the data relating to back thermal comfort produced a similar trend as the data relating to thigh thermal comfort. As illustrated, the back and thigh skin temperatures can increase with an increase in weight, which can correspond with a decrease in thermal comfort. As illustrated in FIG. 3, occupants having weight in a range of from about 170 pounds to about 210 pounds had the highest back skin temperatures, whereas as illustrated in FIG. 4, occupants having a weight in a range of from about 190 pounds to about 230 pounds experienced the highest thigh skin temperatures. Similarly, occupants with a weight in a range of from about 190 pounds to about 240 pounds had the lowest back thermal comfort, as illustrated in FIG. 3, and occupants with a weight in a range of from about 170 pounds to about 210 pounds experienced the lowest thigh thermal comfort. Accordingly, the data illustrates the relationship between high skin temperatures, low thermal comfort, and weight. The differences in skin temperature of the back and thigh, as well as the thermal comfort rating of the back and thigh change with weight of the occupant. The difference in skin temperature and thermal comfort can result in a difference in perceived heating of the seating assembly 10 for occupants having different weights.

Figure 5:
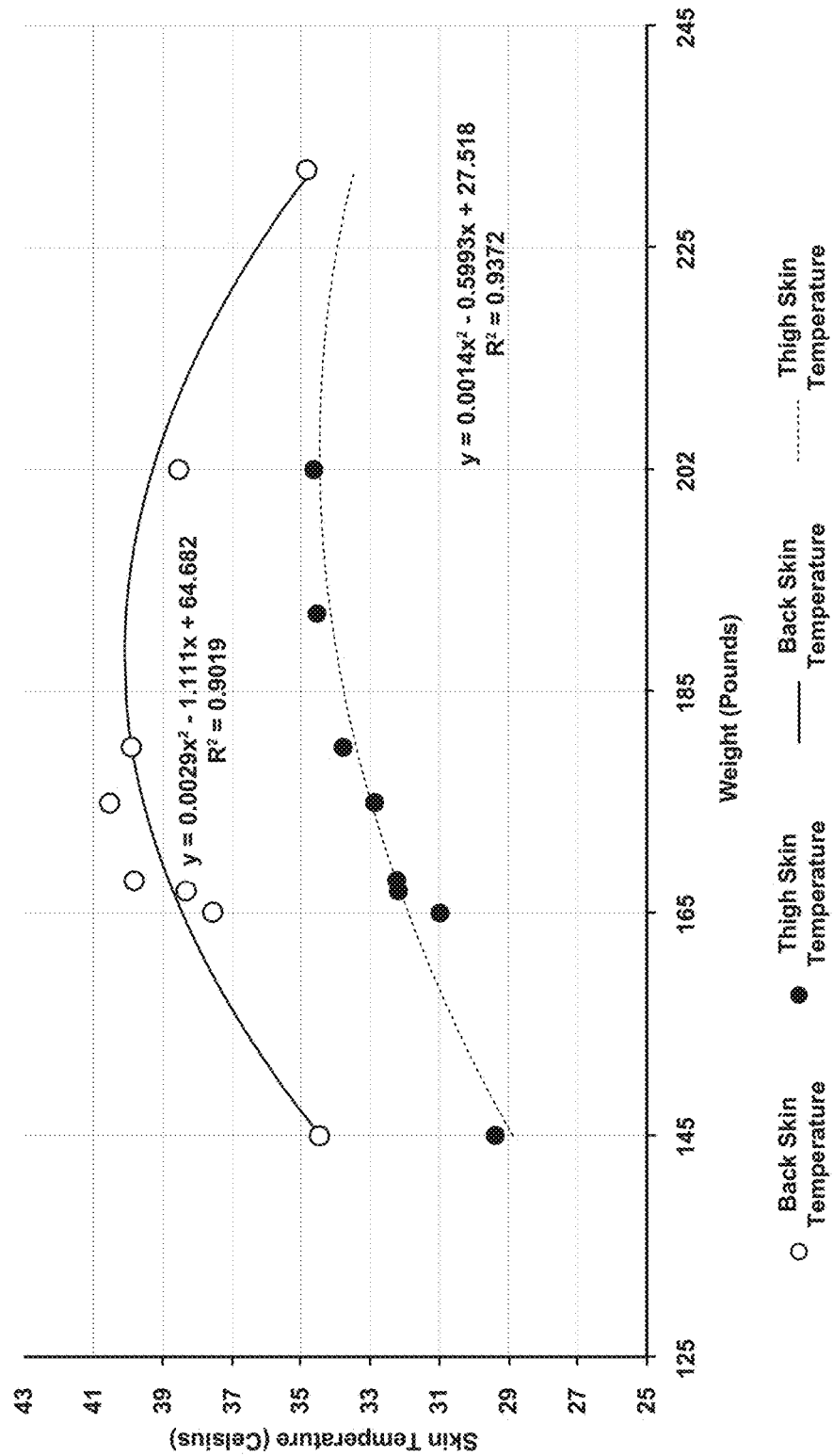
FIG. 5 is a graph illustrating a relationship between back skin temperature and thigh skin temperature of an occupant, according to one example.

Referring to FIG. 5, the data regarding back skin temperature is illustrated in comparison to the data regarding thigh skin temperature of the occupant. The graph of FIG. 5 illustrates a difference in skin temperature between the back and the thigh of the occupant, such that the back skin appears to undergo more dramatic increase in skin temperature than the thigh skin. As illustrated, the data relating to the back skin temperature produced a parabolic fitted line having an equation of $y=0.0029x^2-1.111x^2+64.682$, and the data relating to thigh skin temperature produced a parabolic fitted line having an equation of $y=0.0014x^2-0.5993x+27.518$. The back skin temperature for each of the occupants, as illustrated in FIG. 5, is greater than the thigh skin temperature.

Figure 6:
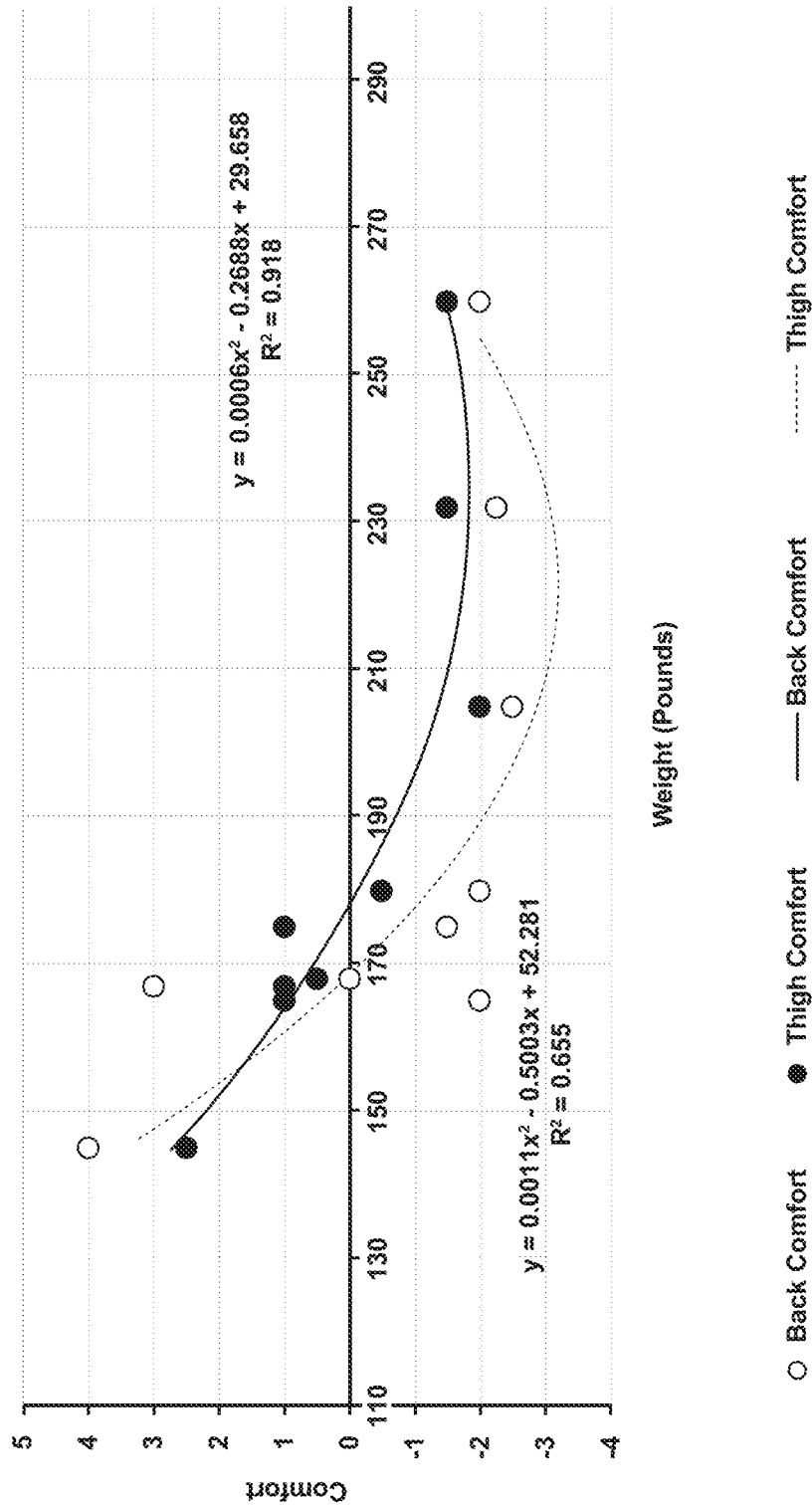
FIG. 6 is a graph illustrating a relationship between back thermal comfort and thigh thermal comfort of an occupant, according to one example.

As illustrated in FIG. 6, the thigh thermal comfort of the occupant is illustrated in comparison with back thermal comfort of the occupant. Generally, the back thermal comfort is lower than the thigh thermal comfort as weight increases when tested at the highest thermal sensation level using the Berkeley Thermal Comfort/Sensation Scale. The data relating to back thermal comfort produced a parabolic fitted line having an equation of $y=0.0011x^2-0.5003x+52.281$, while the data relating to the thigh thermal comfort produced a parabolic fitted line having the equation $y=0.0006x^2-0.2688x+29.658$. As illustrated in FIGS. 5 and 6, the back skin temperature may generally be higher than the thigh skin temperature, and the back thermal comfort level may generally be lower than the thigh thermal comfort level when the seatback 26 is heated to the same temperature as the seat base 18.

Figure 7:
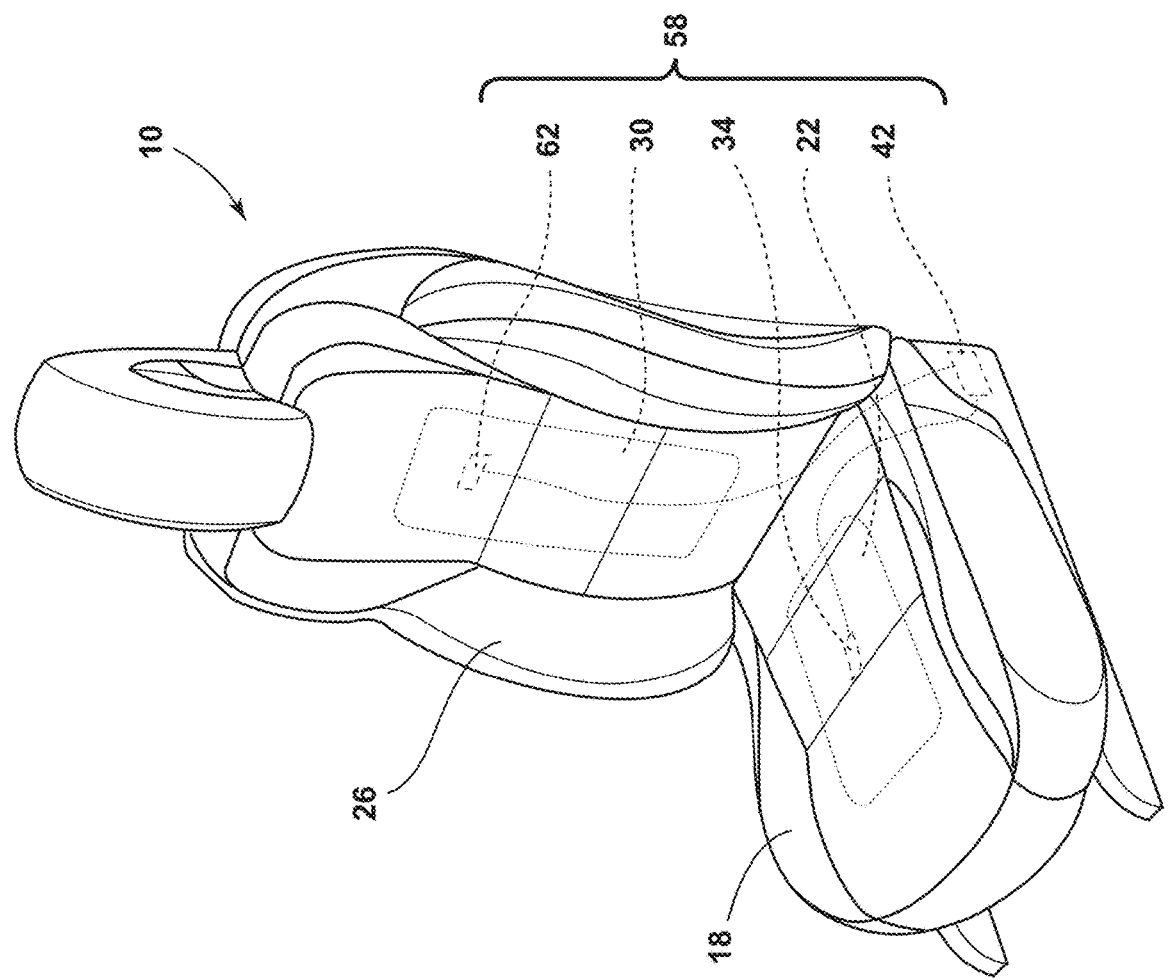
FIG. 7 is a side perspective view of a seating assembly with a heating system, according to one example.

Referring to FIG. 7, the seating assembly 10 may include the first heating element 22 coupled to the seat base 18 and the second heating element 30 coupled to the seatback 26. The sensor 34 may be coupled to one of the seat base 18 and the seatback 26. As illustrated in FIG. 7, the sensor 34 is coupled to the seat base 18. Moreover, an additional or alternative sensor 62 may be coupled with the seatback 26. The seating assembly 10 can include a single sensor 34 or more than one sensor 34, 62. Further, each sensor 34, 62 can be a single sensor or a sensor assembly with multiple individual sensors. Each of the first and second heating elements 22, 30 and the sensors 34, 62 may be in communication with the controller 42.

The sensors 34, 62 may be configured to obtain the weight data of the occupant seated on the seating assembly 10. The sensors 34, 62 can be any practicable sensor configured to obtain a weight, force, or another measurement of the size of the occupant. The sensors 34, 62 may be configured to communicate the weight data to the controller 42. The controller 42 may use the weight data received from at least one of the sensors 34, 62 to control the first and second heating elements 22, 30.

Figure 8:
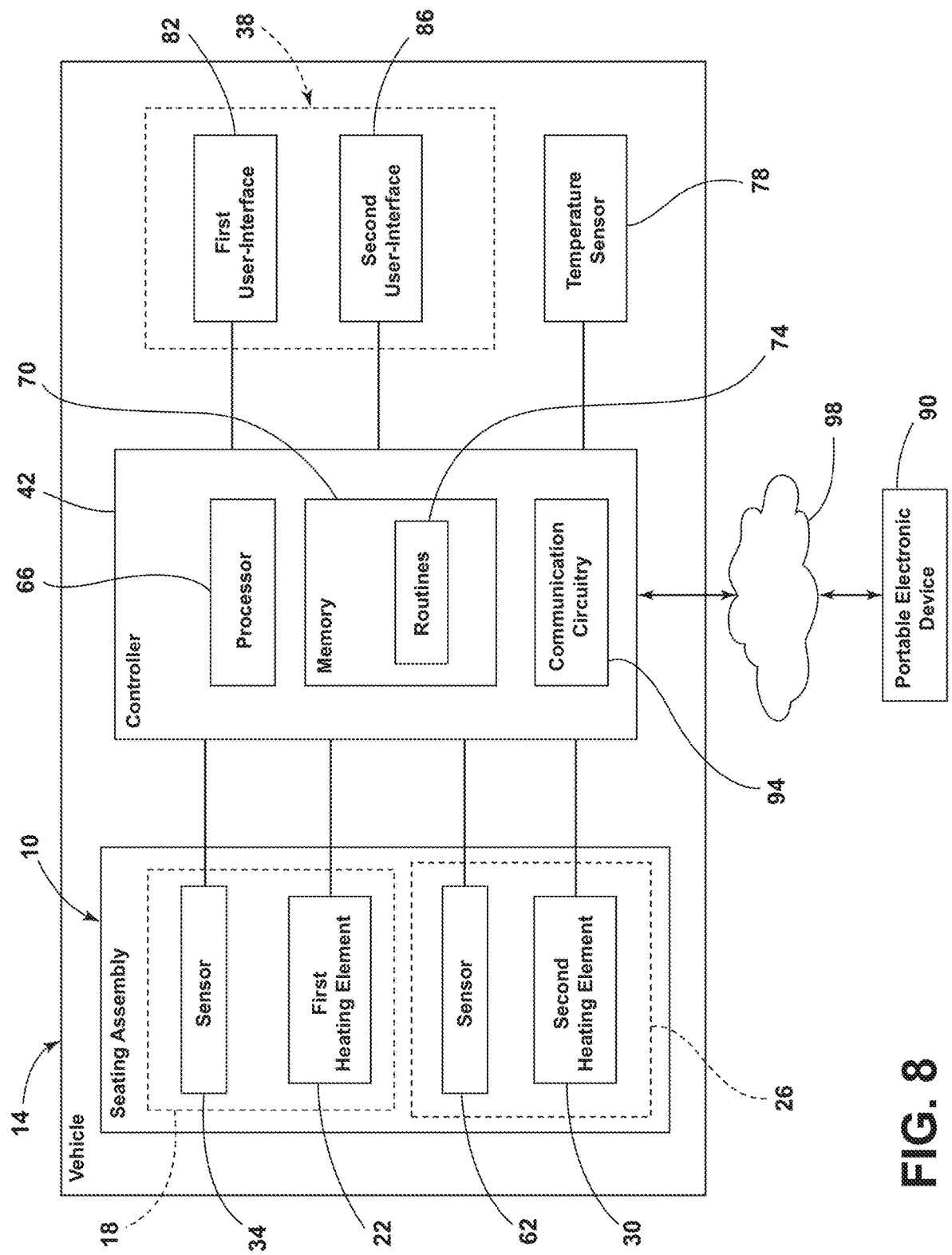
FIG. 8 is a block diagram of a vehicle in communication with a portable electronic device, according to one example.

Referring to FIG. 8, the controller 42 includes a processor 66, a memory 70, and other control circuitry. Instructions or routines 74 are stored in the memory 70 and executable by the processor 66. The controller 42 may include one or more routines 74 relating to controlling the first and second heating elements 22, 30 based on the weight data obtained by at least one of the sensors 34, 62.

According to various aspects, the controller 42 may include one or more routines 74 for processing the weight data to determine a first target temperature of the first heating element 22 and a second target temperature of the second heating element 30. As such, the first and second heating elements 22, 30 may be selectively and/or independently controlled by the controller 42. In this way, the controller 42 may be configured to generate electric currents to flow through the respective first and second heating elements 22, 30 to generate two different heating temperatures. Accordingly, the first target temperature of the first heating element 22 may be different than the second target temperature of the second heating element 30. Therefore, the back of the occupant seated on the seating assembly 10 can be heated independently of the thigh of the occupant. It is contemplated that the controller 42 may activate one or both of the first and second heating elements 22, 30 when the occupant activates the heating system 58 (FIG. 7).

In various examples, the controller 42 may include one or more routines 74 for determining the first target temperature based on the weight data. Additionally or alternatively, the controller 42 may include one or more routines 74 for determining the second target temperature based on the weight data. When determining the first and second target temperatures, the controller 42 may use ambient temperature data obtained by a temperature sensor 78 in communication with the controller 42. The temperature sensor 78 may be configured to obtain the ambient temperature data and communicate the ambient temperature data to the controller 42. The ambient temperature data may be determined within the passenger cabin 46 (FIG. 1) and/or exterior to the vehicle 14. For example, when the temperature sensor 78 obtains a lower ambient temperature data, the first and second target temperatures may be higher than when the temperature sensor 78 obtains a higher ambient temperature data.

Figure 9A:
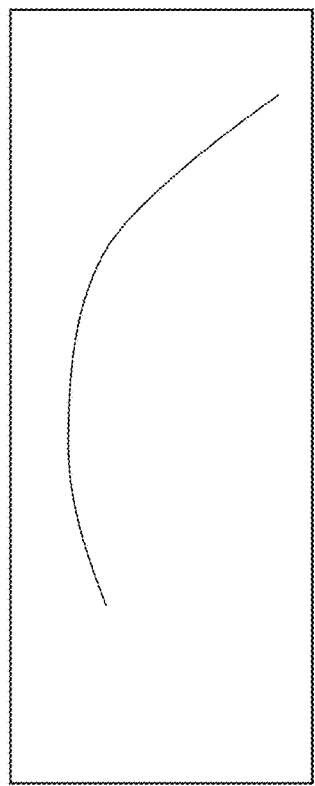
FIG. 9A is a graph illustrating a relationship between weight and target heating temperature, according to one example.
Figure 9B:
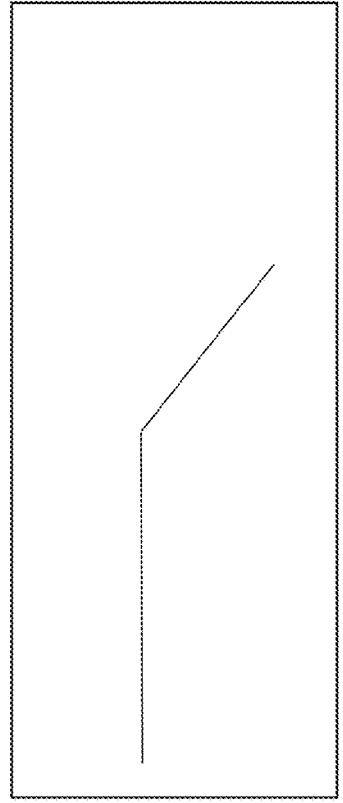
FIG. 9B is a graph illustrating a relationship between weight and target heating temperature, according to one example.
Figure 9C:
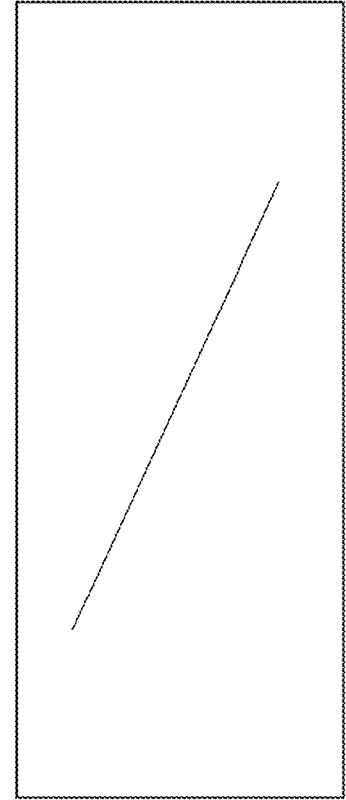
FIG. 9C is a graph illustrating a relationship between weight and target heating temperature, according to one example.

The controller 42 may use the weight data to determine the first and second target temperatures. The weight data may have a variety of relationships with the first and second target temperatures, as illustrated in FIGS. 9A-9C. For example, as illustrated in FIG. 9A, the relationship between the weight data and the first and second target temperatures may be substantially parabolic. As such, the first and second target temperatures may increase as weight increases and then decrease as weight continues to increase. As illustrated in FIG. 9B, the relationship may be substantially constant until a predefined weight and there may be a negative linear relationship. In this way, the first and second target temperatures may be substantially the same for occupants with a weight less than a predefined weight, then the first and second target temperatures may decrease as weight increases after the predefined weight. As illustrated in FIG. 9C, the relationship between weight and the first and second target temperatures may be a negative linear relationship. Accordingly, the first and second target temperatures may decrease as weight increases. It is contemplated that any relationship may be defined between the weight data and the first and second target temperatures.

Moreover, the relationship between the weight data and the first and second target temperatures may be based on assigned weight categories, or alternatively, the weight data obtained by the sensors 34, 62. In various examples, the weight data obtained by the sensors 34, 62 may be communicated to the controller 42, which may include one or more routines 74 for assigning the weight data to one of a plurality of stored, predefined weight categories. The predefined weight categories may be stored in the memory 70. In a non-limiting example, the weight categories may be weight ranges that span about a 10 pound range. The predefined weight categories may be any practicable category for classifying the weight data obtained by the sensors 34, 62. The same routines 74 may determine the first and second target temperatures, or alternatively, separate routines 74 may be utilized. The function pattern (e.g., the defined relationship between the weight data and the first and second target temperatures, such as, parabolic, negative linear, etc.) used to determine the first and second target temperatures may be substantially similar, with the two target temperatures differing by a constant amount (e.g., the first target temperature may be "x" degrees Celsius above the second target temperature or a similar constant difference). Stated differently, the first target temperature can be calculated by an equation (e.g., y=mx+b) and the second target temperature can be calculated using another similar equation with a difference in a constant variable (e.g., y=mx+b+5). This can provide for a more personalized heating system, optimizing skin temperatures and thermal comfort.

Figure 10:
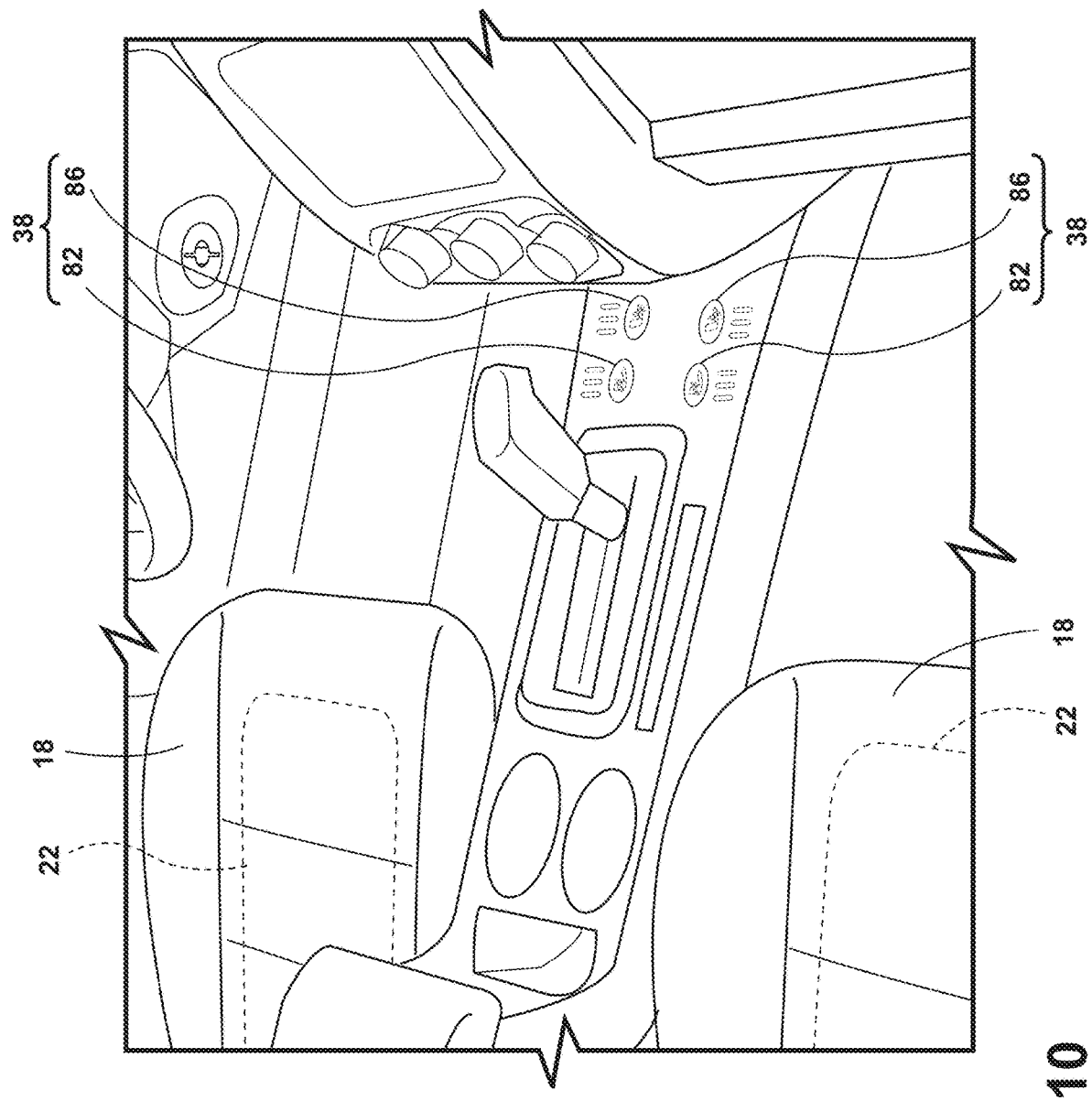
FIG. 10 is a top perspective view of a user-interface assembly associated with a seating assembly, according to one example.

Referring to FIGS. 8 and 10, the controller 42 may be in communication with a user-interface assembly 38. The user-interface assembly 38 may include a first user-interface 82 and a second user-interface 86. The first user-interface 82 may be configured to receive a user input to control the first heating element 22, and the second user-interface 86 may be configured to receive a user input to control the second heating element 30. The user-interface assembly 38 may be configured to adjust the current flowing through the first and second heating elements 22, 30, thereby adjusting the heat of the first and second heating elements 22, 30. The first and second user-interfaces 82, 86 may adjust the perceived temperature relative to the corresponding of the first and second target temperatures. The first user-interface 82 may operate to raise or lower the temperature of the first heating element 22 relative to the first target temperature. The second user-interface 86 may operate similarly with respect to the second heating element 30. When the user-interface assembly 38 increases the heat relative to the respective target temperature, a constant addition of current flows through the corresponding of the first and second heating elements 22, 30. Moreover, when the heat is lowered via the user-interface assembly 38, a constant reduction of the current flowing through the first or second heating element 22, 30 occurs relative to the corresponding target temperature.

The heat generated by the first and second heating elements 22, 30 may be different based on the weight data. For example, a different current may flow through the first and second heating elements 22, 30 when the first and second heating elements 22, 30 are heated to the first and second target temperatures. In a non-limiting example, a greater current can flow through the first heating element 22 or may flow through the second heating element 30 based on the obtained weight data. In another non-limiting example, the first and second heating elements 22, 30 may be different heating assemblies providing for different corresponding heats generated by the first and second heating elements 22, 30. Further, in another non-limiting example, the first and second heating elements 22, 30 may have different number of coils disposed therein, which may correspond with different corresponding heats generated with a substantially similar current flowing through each of the first and second heating elements 22, 30. It is contemplated that the corresponding heats of the first and second heating elements 22, 30 may be generated in any practicable way.

Referring again to FIG. 8, the controller 42 may be configured to determine the first and second target temperatures in response to the weight data obtained by at least one of the sensors 34, 62. Additionally or alternatively, the controller 42 may use a weight data input received from a portable electronic device 90. The portable electronic device 90 may be any cell phones, smart phones, tablets, computers, etc. The controller 42 may include communication circuitry 94, which may be configured to communicate with the portable electronic device 90 or remote servers (e.g., cloud servers, Internet connected databases, computers, etc.) via a communication interface 98.

The communication interface 98 may be a wireless interface, which may correspond to a variety of communication protocols configured to distribute data among various electronic devices. For example, the communication interface 98 may include an IEEE 802.11 connection, an IEEE 802.15 connection, a Bluetooth® connection, a Wi-Fi connection, a WiMAX connection, a cellular signal, a signal using shared wireless access protocol cord axis (SWAP-CA), or any other type of radiofrequency or wireless signal. The IEEE 802.15 connection includes any wireless personal area networks (WPAN), such as Zigbee®, Wave®, Bluetooth®, UWB, and IrDA. In this way, the communication interface 98 may provide for data communication between the controller 42 and the portable electronic device 90. The portable electronic device 90 may be configured to receive the weight data input and communicate the weight data input to the controller 42. The controller 42 may include one or more routines 74 for using the weight data input to determine the first and/or second target temperatures of the first and second heating elements 22, 30.

According to various aspects, the portable electronic device 90 may include a processor, memory, and other control circuitry. The portable electronic device 90 may include one or more instructions or routines stored within the memory and executable by the processor. The portable electronic device 90 may include one or more routines relating to storing activity and/or fitness information of the user of the portable electronic device 90. The activity and/or fitness information may provide dynamic data (e.g., a dynamic weight data input) to the controller 42, such that the controller 42 may dynamically change the first and second target temperatures in response to the information from the portable electronic device 90.

According to various aspects, the controller 42 may store a plurality of predefined weight categories to provide for a personalized heating system 58. In a non-limiting example, the controller 42 may store ten predefined weight categories. Further, each seating assembly 10 can have about nine combinations for heating the seating assembly 10, based on the adjustment (e.g., raise and/or lower) of the heat relative to the first and second target temperatures through the user-interface assembly 38. Stated differently, the first heating element 22 and the second heating element 30 can each operate at the corresponding target temperature, above the target temperature, and below the target temperature. In this way, each seating assembly 10 may provide for about ninety different combinations for heating the seating assembly 10.

Figure 11:
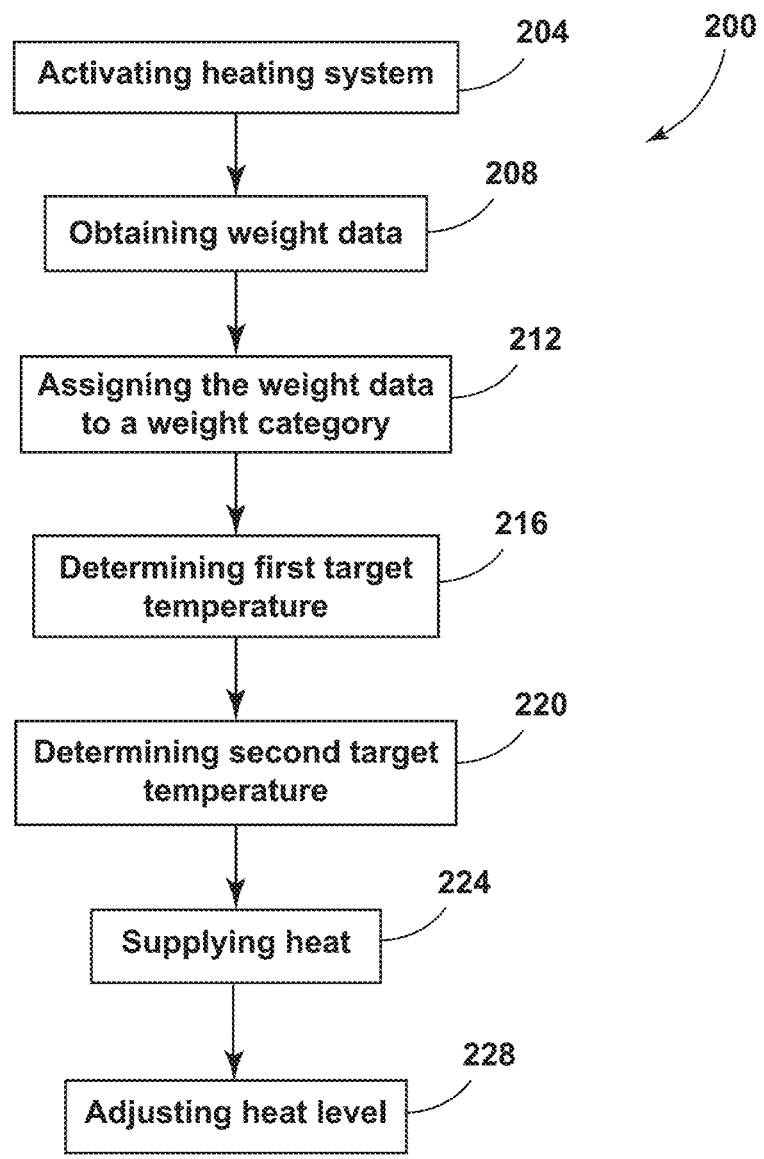
FIG. 11 is a flow diagram of a method of heating a seating assembly, according to one example.

Referring to FIG. 11, and with further reference to FIGS. 1-10, a method 200 of heating the seating assembly 10 includes step 204 of activating the heating system 58. The occupant may manually activate the heating system 58 through the user-interface assembly 38, the portable electronic device 90, or other activation device associated with the vehicle 14. In step 208, the weight data of the occupant seated on the seating assembly 10 is obtained. The weight data may be obtained through at least one of the sensors 34, 62 coupled to the seating assembly 10. In this way, the sensors 34, 62 can obtain the weight data when the occupant is seated on the seating assembly 10. Additionally or alternatively, the weight data input can be obtained in step 208. In such examples, the user may communicate the weight data input through the portable electronic device 90. Further, the activity and/or fitness information of the user may be communicated to the controller 42 by the portable electronic device 90 and associated with the weight data input. As such, the portable electronic device 90 may automatically communicate and/or update the weight data input to the controller 42.

In step 212, the weight data and/or the weight data input may be assigned to one of the plurality of predefined weight categories. According to various aspects, the controller 42 may store the plurality of predefined weight categories in the memory 70. In step 216, the controller 42 may be configured to determine the first target temperature of the first heating element 22. The controller 42 may include one or more routines 74 for analyzing the weight data and/or the weight data input and calculating the first target temperature. In step 220, the controller 42 may be configured to determine the second target temperature of the second heating element 30 using the weight data and/or the weight data input. The controller 42 may include one or more routines 74 to analyze the weight data and/or the weight data input and calculate the second target temperature. The controller 42 may include a single routine 74 for calculating the first and second target temperatures, or alternatively, may include different routines 74 to calculate the first and second target temperatures. The routines 74 (e.g., one or more algorithms) for calculating the first and second target temperatures may be substantially similar, such that the first and second target temperatures are calculated in a substantially similar manner with of constant variation. In this way, one of the first and second target temperatures may be "x" degrees Celsius greater or less than the other of the first and second target temperatures.

In steps 216 and 220, the controller 42 may use the specific weight data and/or the specific weight data input to calculate the first and second target temperatures. Additionally or alternatively, the controller 42 may use the assigned weight category of the weight data and/or the weight data input to calculate the first and second target temperatures. In such examples, the weight data and/or the weight data input that falls within each of the predefined categories may result in substantially similar first and second target temperatures. As such, the first and second target temperatures may define piecewise relationships with the weight data, changing at intervals with each weight category.

In step 224, heat is supplied to the first and second heating elements 22, 30. A current may flow through each of the first and second heating elements 22, 30, thereby generating the heat. The heat supplied by each of the first and second heating elements 22, 30 may be based on the first and second target temperatures determined by the controller 42. The heating of the first and second heating elements 22, 30 may be based on the weight data and/or the weight data input. According to various aspects, the heat supplied to the first and second heating elements 22, 30 may vary based on the weight of the occupant and may account for the difference in perceived heat on the back and the thigh of the occupant, as illustrated in FIGS. 5 and 6.

In step 228, the occupant seated on seating assembly 10 may adjust a heat level (e.g., the heating) of the first and/or second heating elements 22, 30. The occupant can adjust the first heating element 22 via the first user-interface 82 and the second heating element 30 via the second user-interface 86. The occupant can independently adjust the heating of the first and second heating elements 22, 30, such that the occupant can separately increase or decrease the heat of the first and second heating elements 22, 30. In step 228, the controller 42 can regulate the current flowing through the first and second heating elements 22, 30 to adjust the heat based on the input received by the user-interface assembly 38. A constant increase in the current can increase the heat of the first and second heating elements 22, 30 relative to the first and second target temperatures. Moreover, a constant reduction in the current can reduce the heat of the first and second heating elements 22, 30 with respect to the first and second target temperatures.

Use of the present disclosure may provide a variety of advantages. For example, the heating system 58 may provide different perceived heating to the seatback 26 and the seat base 18 of the seating assembly 10. Further, the controller 42 may include one or more routines 74 to calculate the first target temperature for the first heating element 22 coupled to the seat base 18 and the second target temperature for the second heating element 30 coupled to the seatback 26. Additionally, the first and second target temperatures may vary to reduce the difference in perceived heat of the back and the thigh of the occupant. Moreover, the heating system 58 can provide a more uniform perceived heating sensation to the occupant seated on the seating assembly 10. Also, the first and second target temperatures determined by the controller 42 may be based on the weight of the occupant seated on the seating assembly 10. Additionally, the controller 42 may receive the weight data from at least one of the sensors 34, 62 coupled with the seating assembly 10 and/or may receive the weight data input from the portable electronic device 90. The heating system 58 can provide a more personalized heating system 58 to increase the comfort of the occupant seated on the seating assembly 10. Further, the first and second target temperatures can be determined by the controller 42 with minimal or no interaction by the occupant. Moreover, the user-interface assembly 38 can provide the occupant with the ability to increase or decrease the heat level of one or both of the first and second heating elements 22, 30 relative to the first and second target temperatures, as determined by the controller 42. Additional benefits or advantages of using this device may also be realized and/or achieved.

According to various examples, a vehicle seating assembly includes a seat base that has a first heating element. A seat back has a second heating element. A sensor is coupled to the seat base and is configured to obtain a weight data. A user-interface assembly is operably coupled to the first and second heating elements. A controller is in communication with the sensor to receive the weight data. The controller is configured to control the first and second heating elements in response to the weight data. Embodiments of the present disclosure may include one or a combination of the following features:
- a user-interface assembly includes a first user-interface operably coupled to a first heating element and a second user-interface operably coupled to a second heating element;
- a controller is configured to determine a first target temperature of a first heating element based on a weight data;
- a controller is configured to determine a second target temperature of a second heating element based on a weight data;
- a first target temperature is different than a second target temperature;
- a temperature sensor is in communication with a controller, and the controller is configured to control first and second heating elements in response to an ambient temperature data;
- a portable electronic device is in communication with a controller to receive a weight data input; and
- a controller is configured to determine a first and second target temperatures for first and second heating elements in response to at least one of a weight data and a weight data input.

According to various examples, a heating system for a seating assembly includes a seat base that has a first heating element. A seat back is coupled to the seat base and has a second heating element. A portable electronic device is configured to receive a weight data input. A controller is in communication with the portable electronic device to receive the weight data input. The controller is configured to independently control the first and second heating elements in response to the weight data input. Embodiments of the present disclosure may include one or a combination of the following features:
- a controller is configured to determine a first target temperature for a first heating element and a second target temperature for a second heating element based on a weight data input;
- a first target temperature is different than a second target temperature;
- a first user-interface operably coupled to the first heating element and the first user-interface is configured to receive an input to adjust a temperature of a first heating element relative to a first target temperature, wherein a second user-interface operably coupled to a second heating element and the second user-interface is configured to receive an input to a temperature of a second heating element relative to a second target temperature;
- a controller is configured to assign a weight category of a weight data input based on a plurality of stored weight categories;
- at least one of a first target temperature of a first heating element and a second target temperature of a second heating element are determined by a weight category of a weight data input;
- a temperature sensor is in communication with a controller. The controller is configured to control first and second heating elements in response to an ambient temperature data;
- a sensor is coupled to at least one of a seat base and a seat back to obtain a weight data and a controller is in communication with the sensor to receive weight data; and
- a controller is configured to determine first and second target temperatures for the first and second heating elements in response to at least one of a weight data and a weight data input.

According to various examples, a method of heating a seating assembly includes obtaining a weight data of an occupant on a seating assembly. A first target temperature is determined for a first heating element disposed in a seat base based on the weight data. A second target temperature is determined for a second heating element disposed in a seat back based on the weight data. Heat is supplied to the seat base and the seat back based on the first and second target temperatures. Embodiments of the present disclosure may include one or a combination of the following features:
- a weight data is assigned to one of a plurality of predefined weight categories; and
- a weight data is obtained by at least one of a sensor disposed in a seat base and a portable electronic device.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory (e.g., volatile, non-volatile, etc.), other optical disk storage, magnetic disk storage or other magnetic storage devices, or any other medium which can be used to store desired program code means in the form of computer-executable instructions or data structures and which can be accessed by a general-purpose or special-purpose computer.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of heating a vehicle seating assembly, comprising:
    activating a heating system for a seating assembly having a first heating element in a seat base and a second heating element in a seatback;
    obtaining weight information for an occupant disposed on the seating assembly;
    calculating a first target temperature for the first heating element as a function of weight based on the weight information;
    calculating a second target temperature for the second heating element as a function of weight based on the weight information;
    supplying a current to the first heating element to generate heat based on the first target temperature; and
    supplying a current to the second heating element to generate heat based on the second target temperature, wherein at least one of the first target temperature and the second target temperature is configured to decrease as values of the weight information increase.

2. The method of claim 1, wherein the step of activating the heating system may be in response to an input through at least one of a user-interface assembly and a portable electronic device.

3. The method of claim 1, wherein the step of obtaining the weight information includes obtaining the weight information from a sensor operably coupled to the seating assembly.

4. The method of claim 1, wherein the step of obtaining the weight information includes obtaining the weight information from a portable electronic device.

5. The method of claim 1, further comprising:
    assigning the weight information to a predefined weight category, wherein at least one of the first target temperature and the second target temperature are based on the predefined weight category.

6. The method of claim 1, wherein the step of calculating the second target temperature includes calculating the second target temperature as different than the first target temperature by a predefined temperature.

7. The method of claim 1, further comprising:
    adjusting a heat level of the first heating element via a user input.

8. The method of claim 7, wherein the step of adjusting the heat level includes adjusting the heat level relative to the first target temperature.

9. A method of heating a seat, comprising:
    receiving a weight data input from a portable electronic device;
    calculating a first target temperature for a first heating element of a seating assembly based on the weight data input;
    supplying a current to the first heating element to generate heat based on the first target temperature;
    calculating a second target temperature for a second heating element of the seating assembly based on the weight data input; and
    supplying a current to the second heating element to generate heat based on the second target temperature;
    wherein at least one of the fast target temperature and the second target temperature is configured to decrease as values of the weight data input increase.

10. The method of claim 9, further comprising:
    receiving at least one of activity information and fitness information from the portable electronic device; and
    associating the at least one of activity information and fitness information with the weight data input.

11. The method of claim 9, further comprising:
    adjusting the heat generated by the first heating element relative to the first target temperature in response to a first user input; and
    adjusting the heat generated by the second heating element relative to the second target temperature in response to a second user input.

12. The method of claim 9, further comprising:
    receiving weight data from a sensor operably coupled to the seating assembly.

13. The method of claim 9, wherein the second target temperature is different than the first target temperature.

14. The method of claim 9, further comprising:
    activating a heating system of the seating assembly via the portable electronic device.

15. The method of claim 9, further comprising:
    obtaining ambient temperature data from a temperature sensor, and wherein at least one of the first target temperature and the second target temperature are based at least partially on the ambient temperature data.

16. The method of claim 15, wherein at least one of the first target temperature and the second target temperature is higher when the temperature sensor senses lower ambient temperature data than when the temperature sensor senses higher ambient temperature data.

17. A method of heating a seat assembly, comprising:
    obtaining weight data of an occupant on a seating assembly;
    determining a first target temperature for a first heating element disposed in a seat base based on the weight data;
    determining a second target temperature for a second heating element disposed in a seatback based on the weight data; and
    supplying heat to the seat base and the seatback based on the first and second target temperatures, respectively, wherein at least one of the first target temperature and the second target temperature is configured to decrease as values of the weight data increase.

18. The method of claim 17, further comprising:
    assigning the weight data to one of a plurality of predefined weight categories.

19. The method of claim 17, wherein the weight data is obtained by at least one of a sensor disposed in the seating assembly and a portable electronic device.

* * * * *